United States Patent
Nichols

(10) Patent No.: US 10,511,777 B2
(45) Date of Patent: Dec. 17, 2019

(54) PERSONAL CARE DEVICE WITH CAMERA

(71) Applicant: Thomas Nichols, Laguna Niguel, CA (US)

(72) Inventor: Thomas Nichols, Laguna Niguel, CA (US)

( * ) Notice: Subject to any disclaimer, the term of this patent is extended or adjusted under 35 U.S.C. 154(b) by 470 days.

(21) Appl. No.: 15/462,509

(22) Filed: Mar. 17, 2017

(65) Prior Publication Data

US 2018/0125201 A1 May 10, 2018

Related U.S. Application Data

(60) Provisional application No. 62/472,368, filed on Mar. 16, 2017, provisional application No. 62/419,270, filed on Nov. 8, 2016.

(51) Int. Cl.

| A46B 13/00 | (2006.01) |
|---|---|
| H04N 5/232 | (2006.01) |
| H04N 5/225 | (2006.01) |
| A46B 9/02 | (2006.01) |
| A46B 5/00 | (2006.01) |
| A46B 15/00 | (2006.01) |
| A45D 24/00 | (2006.01) |
| A45D 44/00 | (2006.01) |

(52) U.S. Cl.
CPC ....... *H04N 5/23293* (2013.01); *A46B 5/0095* (2013.01); *A46B 9/021* (2013.01); *A46B 13/008* (2013.01); *A46B 15/0004* (2013.01); *H04N 5/2257* (2013.01); *H04N 5/23296* (2013.01); *A45D 24/007* (2013.01); *A45D 2044/007* (2013.01); *A45D 2200/205* (2013.01); *A45D 2200/207* (2013.01); *A46B 2200/1006* (2013.01)

(58) Field of Classification Search
CPC ........ G06T 7/0012; G06T 2207/30088; G06K 2209/05; A61B 5/441; A61B 5/443; A61B 5/444; A61B 5/445; A46B 13/00; A46B 2200/102
USPC .................................................. 601/18, 114
See application file for complete search history.

(56) References Cited

U.S. PATENT DOCUMENTS

| D445,817 S | 7/2001 | Okuley ........................ D16/206 |
| 6,340,677 B1 | 1/2002 | Nishimori et al. ........... 514/169 |
| 6,734,858 B2 | 5/2004 | Attar et al. .................... 345/475 |
| 6,761,697 B2 | 7/2004 | Rubinstenn et al. ......... 600/587 |
| 6,907,193 B2 | 6/2005 | Kollias et al. ..................... 396/4 |
| 6,959,119 B2 | 10/2005 | Hawkins et al. ............. 382/276 |
| 7,006,657 B2 | 2/2006 | Bazin ............................ 382/100 |

(Continued)

FOREIGN PATENT DOCUMENTS

JP 2017-99428 A 6/2017 ............. A46B 13/02

OTHER PUBLICATIONS

Salzano, Megan. "Philips Develops Connected Home Health Care System." Homeworld Business. Dated Sep. 12, 2016. 111-112.

(Continued)

*Primary Examiner* — Andrew W Johns
(74) *Attorney, Agent, or Firm* — Knobbe Martens Olson & Bear LLP

(57) ABSTRACT

A personal care system having a treatment device for applying a treatment to the skin or hair of a user is provided. The treatment device has a camera for taking an image of the skin. The system includes an application programming interface (API) that can process the image. The API can recommend the use of treatment regimens or topical products according to information the API gathers from the digital image of the skin.

30 Claims, 15 Drawing Sheets

(56) References Cited

U.S. PATENT DOCUMENTS

| | | | |
|---|---|---|---|
| 7,104,800 B2 | 9/2006 | Ortiz-Valero et al. | 434/371 |
| 7,151,956 B2 | 12/2006 | Satoh et al. | 600/476 |
| D540,838 S | 4/2007 | Aronsson et al. | D16/206 |
| 7,220,254 B2 | 5/2007 | Altshuler et al. | 606/9 |
| 7,233,693 B2 | 6/2007 | Momma | 382/162 |
| 7,258,675 B2 | 8/2007 | Nichols | 601/10 |
| D552,809 S | 10/2007 | Linsbichler | D32/14.1 |
| 7,309,335 B2 | 12/2007 | Altshuler et al. | 606/11 |
| 7,317,818 B2 | 1/2008 | Lefebvre | 382/128 |
| 7,324,668 B2 | 1/2008 | Rubinstenn et al. | 382/118 |
| 7,454,046 B2 | 11/2008 | Chhibber et al. | 382/128 |
| 7,477,767 B2 | 1/2009 | Chhibber et al. | 382/128 |
| D589,650 S | 3/2009 | Adriaenssen | D28/44.1 |
| 7,564,990 B2 | 7/2009 | Kern et al. | 382/100 |
| 7,738,032 B2 | 6/2010 | Kollias et al. | 348/370 |
| 7,764,303 B2 | 7/2010 | Pote et al. | 348/77 |
| 7,856,118 B2 | 12/2010 | Kalla et al. | 382/100 |
| 7,894,651 B2 | 2/2011 | Gutkowicz-Krusin et al. | 382/128 |
| 7,953,613 B2 | 5/2011 | Gizewski | 705/3 |
| 7,986,987 B2 | 7/2011 | Bazin et al. | 600/407 |
| 8,026,942 B2 | 9/2011 | Payonk et al. | 348/77 |
| 8,027,505 B2 | 9/2011 | Edgar et al. | 382/100 |
| D649,636 S | 11/2011 | Bean et al. | D24/133 |
| 8,094,186 B2 | 1/2012 | Fukuoka et al. | 348/77 |
| 8,109,875 B2 | 2/2012 | Gizewski | 600/306 |
| 8,150,501 B2 | 4/2012 | Stamatas | 600/477 |
| 8,155,413 B2 | 4/2012 | Chhibber et al. | 382/128 |
| 8,157,753 B2 | 4/2012 | Nichols | 601/17 |
| 8,238,623 B2 | 8/2012 | Stephan et al. | 382/128 |
| 8,260,010 B2 | 9/2012 | Chhibber et al. | 382/128 |
| 8,360,973 B2 | 1/2013 | Bazin et al. | 600/300 |
| D675,829 S | 2/2013 | Jakubow | D4/102 |
| 8,373,859 B2 | 2/2013 | Chhibber et al. | 356/366 |
| 8,391,639 B2 | 3/2013 | Hillebrand et al. | 382/284 |
| 8,401,300 B2 | 3/2013 | Jiang et al. | 382/190 |
| 8,428,382 B2 | 4/2013 | Sato | 382/254 |
| 8,437,540 B2 | 5/2013 | Stephan et al. | 382/162 |
| 8,484,155 B2 | 7/2013 | Yamaguchi et al. | A45D 44/00 |
| 8,532,736 B1 | 9/2013 | Malzbender et al. | 600/407 |
| D693,932 S | 11/2013 | Nichols | D24/214 |
| 8,591,414 B2 | 11/2013 | Kitamura et al. | 600/306 |
| 8,597,187 B2 | 12/2013 | Nuccitelli et al. | 600/306 |
| 8,611,588 B2 | 12/2013 | Kang | 382/100 |
| 8,620,421 B2 | 12/2013 | Yeo | 604/20 |
| 8,634,648 B2 | 1/2014 | Hyde et al. | 382/190 |
| D700,316 S | 2/2014 | Nichols | D24/110 |
| 8,644,615 B2 | 2/2014 | Hyde et al. | 382/190 |
| 8,652,042 B2 | 2/2014 | Mattoli et al. | 600/306 |
| 8,696,605 B2 | 4/2014 | Nichols | 601/17 |
| D713,971 S | 9/2014 | Nichols | D24/201 |
| 8,823,934 B2 | 9/2014 | Chhibber et al. | 356/366 |
| 8,837,796 B1 | 9/2014 | Zalutskaya | G06T 7/0016 |
| 8,855,751 B2 | 10/2014 | Kruglick | A61B 5/0064 |
| 8,861,863 B2 | 10/2014 | Chhibber et al. | G06K 9/2018 |
| 8,884,242 B2 | 11/2014 | Chhibber et al. | A61B 5/0059 |
| 8,915,562 B2 | 12/2014 | Edgar et al. | B41J 3/36 |
| 8,941,727 B2 | 1/2015 | Rassman et al. | A61B 5/1072 |
| 8,965,081 B2 | 2/2015 | Nagase et al. | G01N 23/04 |
| 9,075,003 B2 | 7/2015 | Oe et al. | G01N 21/359 |
| D736,399 S | 8/2015 | Nichols | D24/214 |
| 9,101,320 B2 | 8/2015 | Cummins et al. | A61B 5/441 |
| D738,508 S | 9/2015 | Nichols | D24/172 |
| 9,122,906 B2 | 9/2015 | Nakamura et al. | G06K 9/0014 |
| 9,138,257 B2 | 9/2015 | Revivo | A61B 17/54 |
| D742,003 S | 10/2015 | Tasar | D24/146 |
| 9,189,679 B2 | 11/2015 | Yamazaki et al. | G06K 9/00228 |
| D747,800 S | 1/2016 | Dunleavy et al. | D24/133 |
| 9,247,802 B2 | 2/2016 | Edgar | A45D 44/005 |
| 9,256,963 B2 | 2/2016 | Cummins et al. | G06T 11/00 |
| 9,272,141 B2 | 3/2016 | Nichols | A61N 1/36014 |
| D753,400 S | 4/2016 | Khoun et al. | D4/102 |
| 9,326,685 B2 | 5/2016 | Krishnan et al. | A61B 5/0059 |
| 9,339,194 B2 | 5/2016 | Adams | A61B 5/0205 |
| 9,351,683 B2 | 5/2016 | Yoshida | A61B 5/442 |
| 9,384,543 B2 | 7/2016 | Stephan et al. | G06T 7/0012 |
| D764,173 S | 8/2016 | Nichols | D4/102 |
| 9,402,546 B2 | 8/2016 | Segman | A61B 5/0077 |
| 9,414,780 B2 | 8/2016 | Rhoads | A61B 5/441 |
| 9,427,187 B2 | 8/2016 | Gilbert | A61B 5/441 |
| D765,982 S | 9/2016 | Nichols | D4/102 |
| D774,774 S | 12/2016 | Nichols | D4/102 |
| D780,245 S | 2/2017 | Ruback et al. | D16/206 |
| 9,579,250 B2 | 2/2017 | Nichols | A61H 7/005 |
| D795,423 S | 8/2017 | Chen et al. | D24/133 |
| 9,730,758 B2 | 8/2017 | Carlucci | A61B 19/36 |
| D799,711 S | 10/2017 | Sedic | D24/200 |
| D803,572 S | 11/2017 | Nichols | D4/102 |
| D805,571 S | 12/2017 | Hogstedt et al. | D16/206 |
| D805,572 S | 12/2017 | Hogstedt et al. | D16/206 |
| D813,203 S | 3/2018 | Hardi | D14/218 |
| D822,843 S | 7/2018 | Lenke | D24/215 |
| D825,188 S | 8/2018 | Luo | D4/101 |
| D830,700 S | 10/2018 | Xue | D4/102 |
| 10,252,051 B2 | 4/2019 | Nichols | A61N 1/36014 |
| D848,013 S | 5/2019 | Fuhner et al. | D24/215 |
| 2010/0139682 A1 | 6/2010 | Edgar et al. | 132/208 |
| 2010/0185064 A1 | 7/2010 | Bandic et al. | 600/306 |
| 2012/0041282 A1 | 2/2012 | Nichol et al. | 600/306 |
| 2012/0041283 A1 | 2/2012 | Krishnan et al. | 600/306 |
| 2012/0041284 A1 | 2/2012 | Krishnan et al. | 600/306 |
| 2012/0307032 A1 | 12/2012 | Gomi et al. | 348/77 |
| 2013/0197397 A1 | 8/2013 | Waugh et al. | A61B 5/442 |
| 2014/0194790 A1 | 7/2014 | Crunick et al. | A61H 23/0245 |
| 2014/0314315 A1 | 10/2014 | Chhibber et al. | G06K 9/00221 |
| 2014/0350409 A1 | 11/2014 | Chhibber et al. | A61B 5/0082 |
| 2015/0086104 A1 | 3/2015 | Miyamoto et al. | G06K 9/00147 |
| 2015/0099947 A1 | 4/2015 | Qu et al. | A61B 5/442 |
| 2015/0105635 A1 | 4/2015 | Yoshida et al. | A61B 5/441 |
| 2015/0182757 A1 | 7/2015 | Levine et al. | A61N 5/0616 |
| 2015/0223749 A1 | 8/2015 | Park et al. | A61B 5/443 |
| 2015/0254847 A1 | 9/2015 | Nakamura et al. | G06T 7/0012 |
| 2015/0287190 A1 | 10/2015 | Kim et al. | G06T 7/0012 |
| 2015/0287191 A1 | 10/2015 | Koruga et al. | G06T 7/0012 |
| 2015/0342515 A1 | 12/2015 | Hutchings et al. | A61B 5/448 |
| 2015/0346936 A1 | 12/2015 | Rodan et al. | G06F 3/0484 |
| 2016/0007908 A1 | 1/2016 | Guo | A61B 5/448 |
| 2016/0022008 A1 | 1/2016 | Rabe et al. | A45D 40/261 |
| 2016/0022009 A1 | 1/2016 | Rabe et al. | A45D 40/261 |
| 2016/0022010 A1 | 1/2016 | Rabe et al. | A45D 40/261 |
| 2016/0022011 A1 | 1/2016 | Rabe et al. | A45D 40/261 |
| 2016/0081553 A1 | 3/2016 | Weber et al. | A61B 5/0068 |
| 2016/0154992 A1 | 6/2016 | Shinoda et al. | G06K 9/00228 |
| 2016/0213126 A1 | 7/2016 | Chang | A45D 44/00 |
| 2016/0262624 A1 | 9/2016 | Nakajima et al. | A61B 5/0077 |
| 2017/0202732 A1 | 7/2017 | Nichols | A61H 23/02 |
| 2018/0125201 A1 | 5/2018 | Nichols | A45D 34/042 |
| 2018/0279762 A1 | 10/2018 | Park et al. | A46B 13/02 |

OTHER PUBLICATIONS

Canfield Scientific, Reveal Imager, website accessed dated Sep. 2, 2016.

Canfield Scientific, VISIA, website accessed dated Sep. 2, 2016.

Stella, Rick, "Onvi's Smart Toothbrush Features a Live Video Feed of Your Mouth While You Brush." Digital Trends, Dated May 19, 2016 (accessed Aug. 28, 2019 using the internet archive way back machine).

Takahashi, Dean. "Onvi Launches Smart Toothbrush Prophix, With a Camera to Show You Where to Brush." VentureBeat, dated May 19, 2016 (accessed Aug. 27, 2019 using the internet archive way back machine).

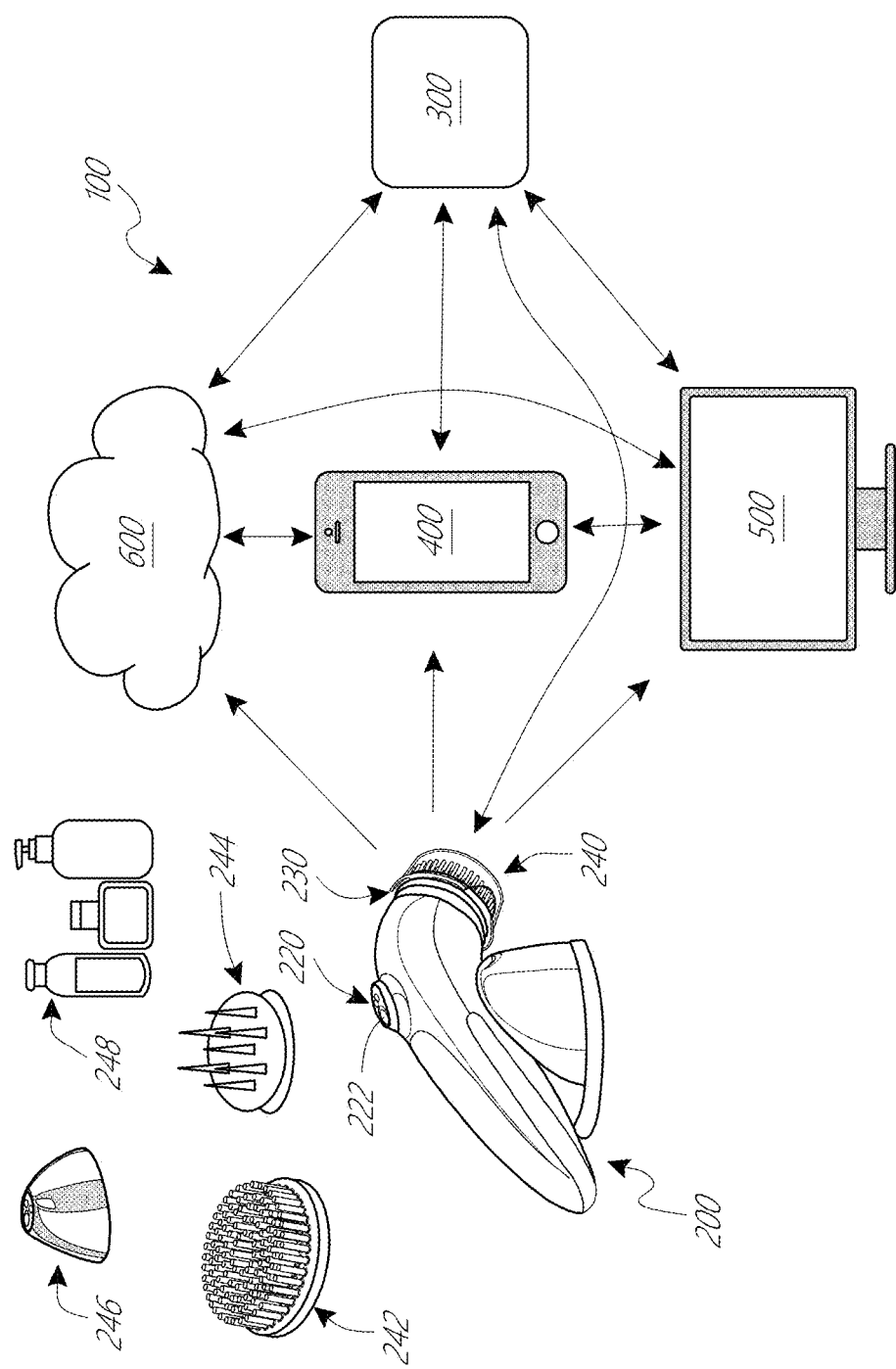

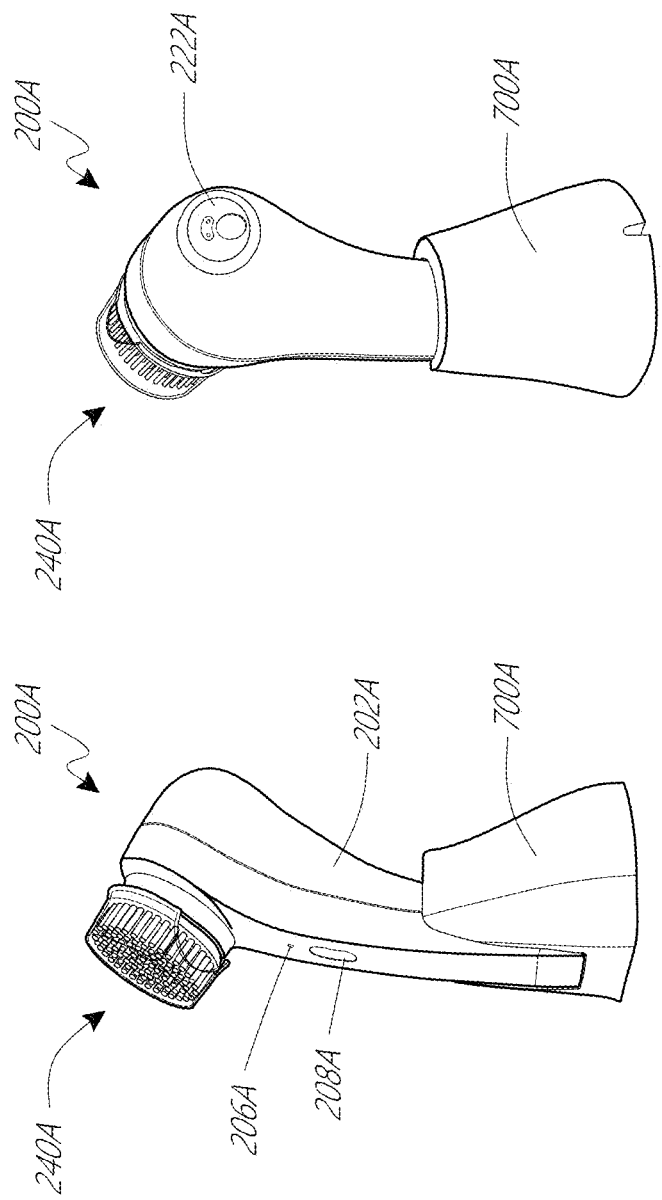

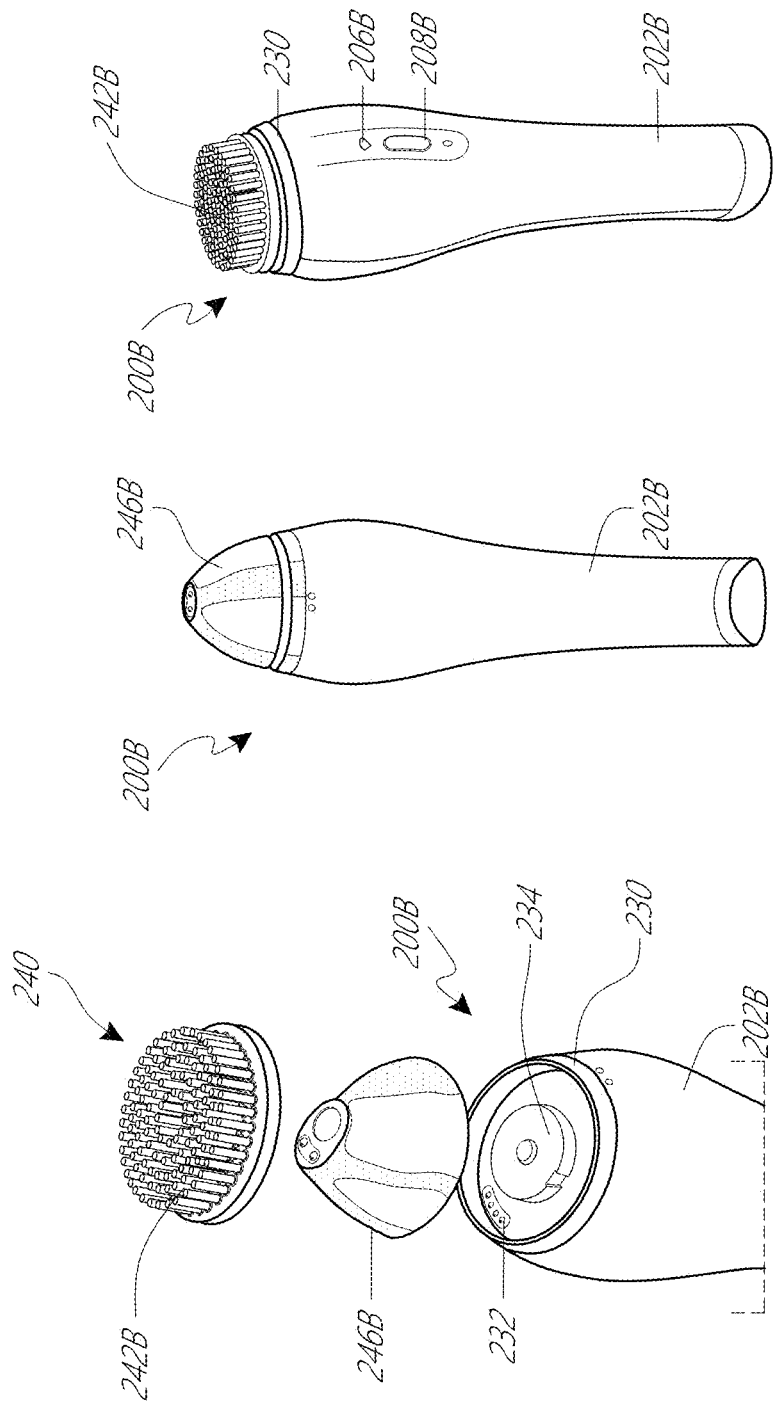

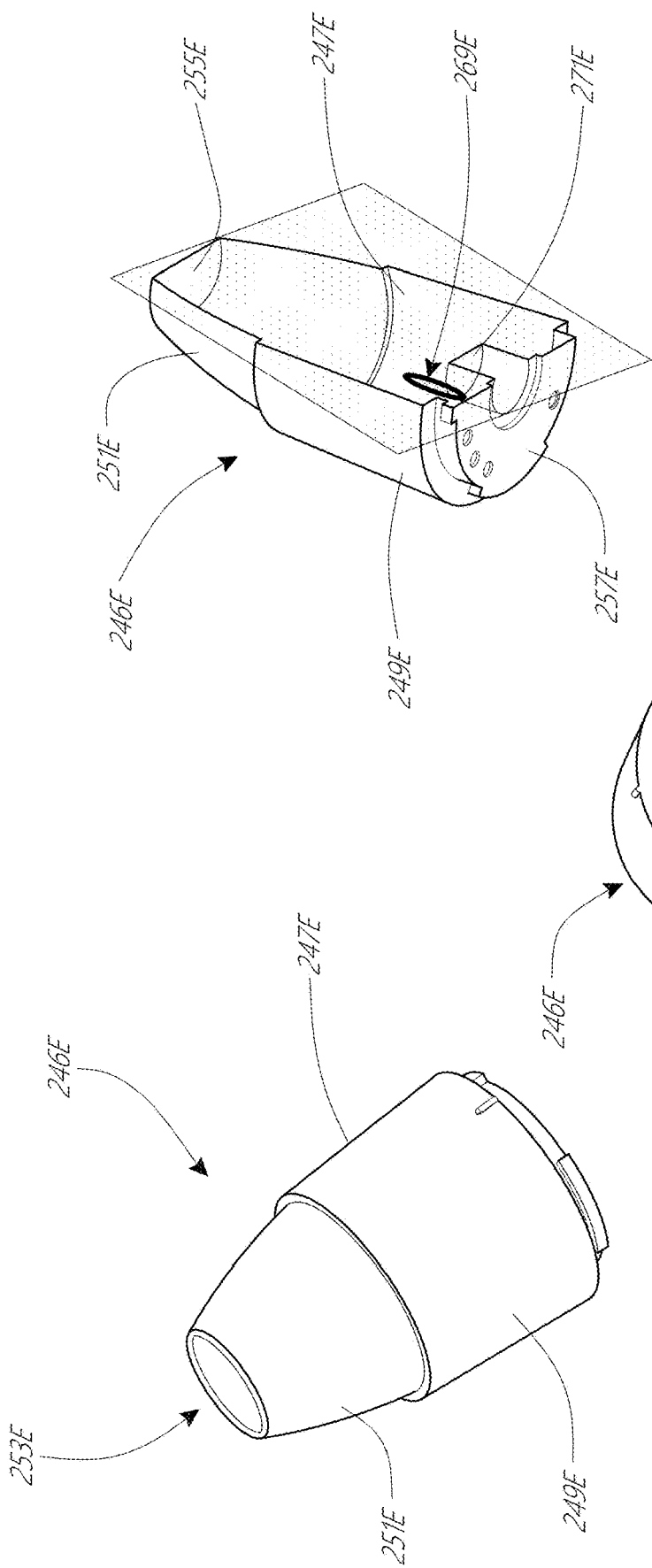
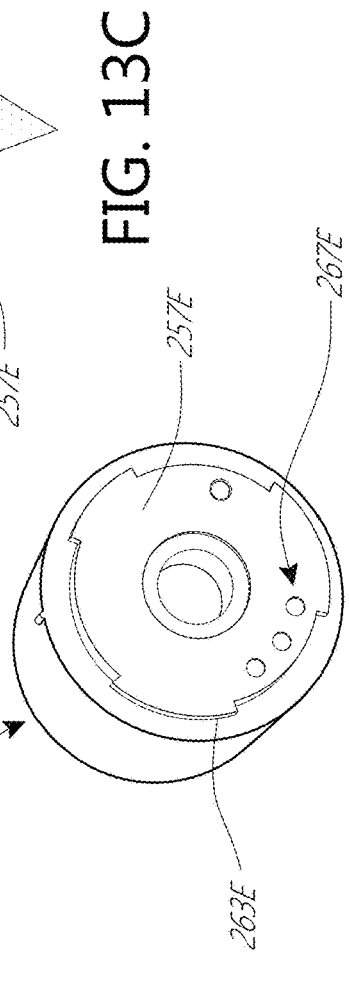
FIG. 13A
FIG. 13B
FIG. 13C

PERSONAL CARE DEVICE WITH CAMERA

INCORPORATION BY REFERENCE TO ANY PRIORITY APPLICATIONS

This application claims priority to provisional U.S. Application No. 62/419,270, filed Nov. 8, 2016, and to provisional U.S. Application No. 62/472,368, filed Mar. 16, 2017. The disclosures of these prior applications are herein incorporated by reference in their entirety and should be considered a part of this specification. Any and all applications for which a foreign or domestic priority claim is identified in the Application Data Sheet as filed with the present application are hereby incorporated by reference under 37 CFR 1.57.

BACKGROUND

Field

This application relates, in general, to a personal care device with an imaging device, and in one arrangement, to a personal skin care device with a camera.

Description of the Related Art

There exist various personal skin care devices. Such devices include facial brushes which can be used to remove cell debris, exfoliate and resurface skin for reduced fine lines, wrinkles and pore size and can prepare the skin to better absorb skin care treatments. Such facial brushes can be used separately or in combination with skin care treatments.

SUMMARY

The systems, methods and devices described herein have innovative aspects, no single one of which is indispensable or solely responsible for their desirable attributes. Without limiting the scope of the claims, some of the advantageous features will now be summarized.

The present application typically describes devices, systems, and methods for personal grooming, and more specifically for caring for skin or hair. In accordance with certain aspects of the present disclosure, there is provided a personal care system that includes a handheld treatment device. The device has a treatment head that applies a treatment to a skin of a user. The device has a camera that takes digital images of the skin. The system has an application programming interface (API) that allows the user to capture images of the skin with the camera and use the images to recommend or adjust the use of a skin care device.

Another aspect of the present disclosure is a method of treating skin. The method includes applying a treatment to the skin with a handheld treatment device and acquiring an image of the skin with a camera attached to the handheld treatment device. The method further includes processing the image of the skin with an API.

In some aspects, a personal care system is disclosed. The personal care system includes a handheld treatment device, a treatment head, a camera, and an application programming interface (API). The treatment head is disposed on the treatment device and configured to apply a treatment to a skin of a user. The camera is disposed on the treatment device. The API allows the user to capture one or more images of the skin then use said one or more images to recommend or adjust the use of a skin care device.

The personal care system of the preceding paragraph can further include one or more of the following features: The camera is a detachable camera that can be removed from the treatment device. The detachable camera includes a housing. The housing circumferentially surrounds a focusing lens. The focusing lens is longitudinally spaced apart from a camera lens by a distance equal to a focal length of the focusing lens. The detachable camera includes the camera lens. The detachable camera further includes a light source that is circumferentially surrounded by the housing. Each of the camera and the treatment head can be reversibly coupled to a platform disposed on the handheld treatment device. The handheld treatment device can be selected from the group consisting of a facial brush, a micro current device, a LED light device and an ultrasound device. The API can recommend a topical skin care product. The camera can acquire the one or more images at a magnification of 10× to 400×. The personal care system is used in combination with a display for displaying images captured by the camera. The display includes a foldable handle. The foldable handle extends from a back surface of the display. The foldable handle is movable between a first configuration and a second configuration. The foldable handle is substantially parallel with a screen of the display in the first configuration. The foldable handle forms an angle with the screen in the second configuration. The angle is between 20 degrees and 80 degrees.

In some aspects, a method of treating a skin is disclosed. The method includes applying a treatment to the skin with a handheld treatment device; acquiring an image of the skin with a camera attached to the handheld treatment device; and processing the image with an application programming interface (API).

The method of the preceding paragraph can further include one or more of the following features: The step of acquiring an image of the skin includes acquiring a first image before applying the treatment to the skin; and acquiring a second image after applying the treatment to the skin. The method further includes the steps of attaching a treatment head to the handheld treatment device before applying the treatment to the skin; removing the treatment head from the handheld treatment device after applying the treatment to the skin; and attaching the camera to the handheld treatment device after removing the treatment head from the handheld treatment device.

BRIEF DESCRIPTION OF THE DRAWINGS

Throughout the drawings, reference numbers can be reused to indicate general correspondence between reference elements. The drawings are provided to illustrate example embodiments described herein and are not intended to limit the scope of the disclosure.

FIG. 1 shows an embodiment of a personal care system.

FIG. 4A shows a partial front view of an embodiment of a treatment device in a docking cradle.

FIG. 4B shows a partial rear view of the treatment device and docking cradle of FIG. 4A.

FIG. 5C shows an embodiment of a treatment device having detachable treatment heads.

FIG. 5D shows the treatment device of FIG. 5C with a detachable camera attached to the treatment device.

FIG. 5E shows the treatment device of FIG. 5C with a brush attached to the treatment device.

FIG. 13A shows a side view of the detachable camera of FIG. 10A.

FIG. 13B shows a bottom view of the detachable camera of FIG. 13A.

FIG. 13C shows a cross-sectional side view of the detachable camera of FIG. 13A.

DETAILED DESCRIPTION

Figure 2B:
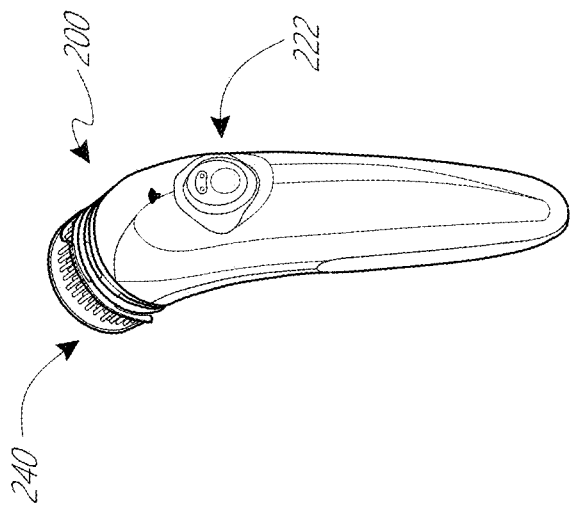
FIG. 2B shows a partial rear view of the treatment device of FIG. 2A.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extend beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Most people use personal care products to give themselves an aesthetically-pleasing external appearance. Personal care products can include skin and hair care products such as, for example, cleansing brushes, exfoliating pads, electrical energy therapy devices, pulsed-light therapy devices, acoustical energy therapy devices, hair shampoos and conditioners, cosmetics, and skin lotions. Many of these products can be used in different operational modes. For example, a skin-cleansing brush can be used on a device that spins the brush at a high-speed, at a low-speed, in an oscillatory mode, or in other some combination of these modes. Personal care products can be used with other personal care products. For example, a microcurrent therapy device can be used to increase skin absorption of a lotion. Thus, consumers can have a wide variety of personal care treatment regimens from which they can select when they are seeking to manage the care of their skin and/or hair. An aspect of the present disclosure is the recognition that there is a need for a device that can help a consumer select or monitor a use of a personal care treatment product and/or treatment regimen.

FIG. 1 shows an embodiment of a personal care system 100 of the present disclosure. The personal care system 100 can be a home-use skin treatment system. The system 100 can include a treatment device 200. The treatment device 200 can be a handheld personal care device, such as, for example a facial beauty device or hair apparatus. The treatment device 200 can include a platform 230 that allows a treatment head 240 to be attached to the device 200. As discussed below, the platform 230 can be adapted so that different treatment heads 240 can be attached and removed from the device 200. In some embodiments, the treatment head 240 cannot be removed from the platform 230 without destroying the device 200. The device 200 can include a camera 220 that is disposed on or contained within the device 200. The camera 220 can be a fixed camera 222 that is bonded or otherwise fixedly attached to the treatment device 200. In some arrangements, the camera 220 can be a detachable camera 246 that can be reversibly attached to the treatment device 200. The detachable camera 246 can attach to the device 200 at the platform 230. The platform 230 can be configured so that either a detachable camera 246 or a treatment head 240 can be attached to the device 200 at the platform 230. As discussed below, a user can attach a treatment head 240 to the device 200 at the platform 230, treat the skin with the device 200 using the treatment head 240, remove the treatment head 240 from the platform 230, attach a detachable camera 246 to the device 200 at the platform 230, and take images of the skin with the detachable camera 246 to see how well the treatment head 240 treated the skin. The system 100 can process images from the camera 220 to allow a user to assess a condition of the skin or hair, as described in more detail below.

In certain arrangements, the device 200 can be waterproof or water-resistant, allowing the device 200 to be submerged or brought into contact with water without damaging the device 200. The device 200 can be adapted to allow a user to use the device 200 in a shower or a bathtub. The housing of the device 200 can form a water-tight seal that prevents water from entering the internal space of the device 200, thereby protecting the internal electronics of the device 200 from being contacted by water. The housing of the device 200 can form a water-tight seal with the platform 230 and the fixed camera 222. The fixed camera 222 can be waterproof or water-resistant, allowing the device 200 to be used in a shower or a bathtub.

In some arrangements, the device includes the detachable camera 246 and does not include the fixed camera 222, thereby reducing the need to make a water-tight seal for the fixed camera 222. For example, the platform 230 can be waterproof or water-resistant, allowing the device to be submerged in water when a treatment head is attached to the platform 230. The detachable camera 246, however, need not be waterproof or water-resistant, allowing the user to use the detachable camera 246 only under non-washing conditions. For example, a treatment head 240 can be attached to the platform 230, which forms a water-tight seal with the device 200, and used to administer a cleansing treatment to the skin of the user. The device 200 can be submerged or brought into contact with water without damaging the device 200 during use of the device 200 with the treatment head 240 attached to the device 200. Under non-washing (e.g., dry) conditions, the detachable camera 246 can be attached to the platform 230 and used to image the skin of the user. The housing of the detachable camera 246 need not be, but can be, waterproof or water-resistant. A detachable camera 246 that does not require a water-proof or water-resistant camera housing may reduce manufacturing costs of the device 200 compared with a device 200 having a fixed camera 222 that requires a waterproof or water-resistant camera housing.

The system 100 can include an application programming interface (API) 300. The API 300 can be configured as a software application (APP) that is downloaded onto a mobile phone 400 or other home computing device (e.g., tablet, personal computer). The system 100 can include a display 500. The display 500 can include a processor and a memory storage onto which the API 300 is downloaded. The display 500 can be an LCD monitor. The display can be adapted to sit on a vanity. The system 100 can be used in a home, a salon, or a retail cosmetics counter. The display 500 can be waterproof or water-resistant. The display 500 can be a touchscreen display. The display 500 can have a graphic user interface (GUI) that allows a user to interact with other components of the system 100 (e.g., the API 300). The display 500 can include control buttons or other input devices that allow a user to interact with other components of the system 100 through the display 500.

As discussed below, the API 300 can run on one or more of the treatment device 200, the mobile phone 400 or other home computing device, and the display 500. The API 300 and software updates to the API 300 can be downloaded from the internet. In some arrangements, the API 300 comes already downloaded onto one of the components of the system 100, such as, for example, the display 500. As shown in FIG. 1, the system 100 can include components that communicate with a network of servers 600. The network of servers 600 can herein be referred to as "the cloud." One or more components of the system 100 (e.g., the device 200, the display 500) can communicate with one another wirelessly (e.g., Wi-Fi, Bluetooth) or through wired connections.

With continued reference to FIG. 1, the device 200 can include a treatment head 240. The treatment head 240 can include a brush 242, an energy-delivery applicator 244, a camera 246, and/or combinations thereof. The energy-delivery applicator 244 can be, for example, a micro-current applicator, a LED light applicator, an impulsed light applicator, a heat applicator, an ultrasound applicator, and/or combinations thereof. The treatment head 240 can be a facial scrubbing brush or a makeup remover pad. The treatment head 240 can apply micro current for wrinkle reduction or LED light for wrinkle reduction and treatment of acne. The treatment head 240 can apply ultrasound for infusing. The treatment head 240 can be a micro-pulsating infuser to enhance skin absorption. The treatment head 240 can apply impulse light for hair removal or hair growth. The treatment head 240 can apply high-frequency vibration to exfoliate.

The treatment head 240 can be fixedly attached to the device such that the treatment head 240 cannot be removed from the device 200 without destroying the device 200. In some arrangements, the treatment head 240 can be reversibly attached to the device 200. In certain configurations, the device 200 can receive a variety of different detachable treatment heads 240 thereby allowing a user to remove a first treatment head 240 from the device 200 and attach a different treatment head 240 to the device 200. For example, a user can use the device 200 with a removable brush 242 attached to the device 200. The user can then remove the detachable brush 242 from the device 200 and attach a detachable camera 246 and take a digital image of the user's skin to see how well the brush 242 cleaned the user's skin.

The system 100 can process images from the camera 220. In some arrangements, the API 300 can be used for capturing an image with the camera 220. The API 300 can be used to process images, such as, for example, an image of the consumer's skin. The API 300 can be used to process images captured by the camera 220. The API 300 can be external to and in communication with the device 200. In some arrangements, the API 300 can be included within the device 200. In certain configurations, the system 100 can include a device 200 that includes a camera 220 and an API 300 within the device 200. The camera 220 can use the API 300 to link via Wi-Fi or Bluetooth to the mobile device 400, the display 500, the cloud 600, or combinations thereof. The API 300 can link a fixed camera 222 or a detachable camera 246 to the mobile device 400, the display 500, the cloud 600, or combinations thereof. The API 300 can allow a user to program or control the operation of the device 200. In some arrangements, the API 300 can allow a user to use a GUI of the display 500 or the mobile phone 400 to program or control the operation of the device 200. For example, the API 300 can allow a user to use the mobile phone 400 to program the speed at which, and/or the duration of time, the device 200 rotates a brush that is attached to the treatment head 240 of the device 200. The API 300 can allow a user to schedule or program treatment regimens. The device 200 can recognize the treatment head 240 attached to the device 200 and can alert a user if in improper treatment head 240 is attached to the device 200.

As discussed above, the camera 220 and the API 300 can allow a user to digitally photograph a section of skin. The system 100 can allow a user to acquire a digital image of skin at an increased magnification. For example, the system 100 can allow a user to photograph a section of skin at a magnification of about: 10×, 50×, 400×, and values therebetween. In some arrangements, the system 100 includes a camera 220 that includes a zoom-in feature that increases the magnification of the camera 220. In certain configurations, the system 100 can have a device 200 that can receive different detachable cameras 246, allowing a user to exchange the different detachable cameras 246 in order to acquire images at different magnifications. For example, a user can attach a first detachable camera 246 to the device 200 to acquire an image of the skin at a magnification of about 50×. The user can then remove the first detachable camera 246 from the device 200 and attach a second detachable camera 246 to acquire an image of the skin at a magnification of about 400×.

A user may acquire digital photographs to provide information relating to a condition of the skin, such as, for example, depth of fine lines and wrinkles, moisture and oil levels within the skin, debris of the epidermis. In some arrangements, a user may acquire images of the skin at 10× to 400× magnification to provide information relating to a condition of the skin such as, for example, depth of fine lines and wrinkles, moisture and oil levels within the skin, debris of the epidermis.

The system 100 can allow a user to acquire images of the skin before and/or after a treatment of the skin. The system 100 can enable "before-and-after" visual results. For example, a user can take a "before" image before treating the skin, then treat the skin, and then take an "after" image of the skin. The treatment administered to the skin can be administered by the device 200. The system 100 can allow a user to evaluate a treatment administered to the skin. For example, a user can use the system 100 to take a series of images of the skin over the course of time (e.g., over days, weeks, months) and compare the images to one another to evaluate whether a treatment regimen applied to the skin is effective at improving a skin condition (e.g., wrinkle reduction).

The API 300 can help a user manage the images that are acquired with the device 200. For example, the API 300 can allow a user to view, organize, and archive the images a user takes with the system 100. The API 300 can capture and store images and build records. The API 300 can track how often and how well each treatment improves a condition of the skin. The API 300 can look at trends in the skin condition over time. The API 300 can provide the user easy-to-follow tips to improve preventative and daily skin care habits. The API 300 can transfer the images to one or more of the mobile device 400, the display 500, and the cloud 600. The API 300 can tag information to the image such as the date and/or time that the image was acquired. The API 300 can tag the image with information about how the device 200 was used immediately before the image was acquired. The API 300 can track the operational modes of the device 200 with the resulting images. For example, images that indicate skin irritation can be correlated with the operational modes of the device 200 that preceded the image such that the API 300 can recommend a change in the treatment regimen applied to the skin by the device 200. The API 300 can allow a user to tailor the operational mode of the device 200 according to the skin sensitivity or skin condition of the user. In some arrangements, the API 300 can take information detail from the digital image and provide the user with corrective information. The API 300 can provide a user with guidance on how the device 200 can be used to improve the condition of the skin. For example, the API 300 can recommend a type of brush 242 or energy-delivery applicator 244 to use on the device 200, an operational mode for using the device 200, and/or a lotion or topical skin product 248 to incorporate for use in combination with the device 200.

The API 300 and the camera 220 can be incorporated into a device 200 such as a rotatable brush such as a Sonic Dermabrasion brush from PRETIKA™. The API 300 and the camera 222 can be incorporated into existing personal care devices known in the art such as a MicroCurrent device, a LED light device, or an Ultrasonic device.

The system 100 can allow the user to watch live digital image and/or video feed on a mobile device 400 or display 500 during use of the device 200. The system 100 can allow users to see before and after results in real-time on a display 500 that is a small LCD monitor that is included with the device 200. In some arrangements, the system 100 does not include a display 500 with the device 200 and can allow users to see before and after results in real-time on a mobile device 400. The system 100 can wirelessly synch the device 200 with one or more of the cloud 600, the mobile device 400, and the display 500 using Bluetooth and Wi-Fi. The device 200 and the display 500 can include a USB charger to charge the device 200 and/or the display 500. The USB charger can charge and/or transfer data to or from the device 200 and the display 500.

Figure 2A:
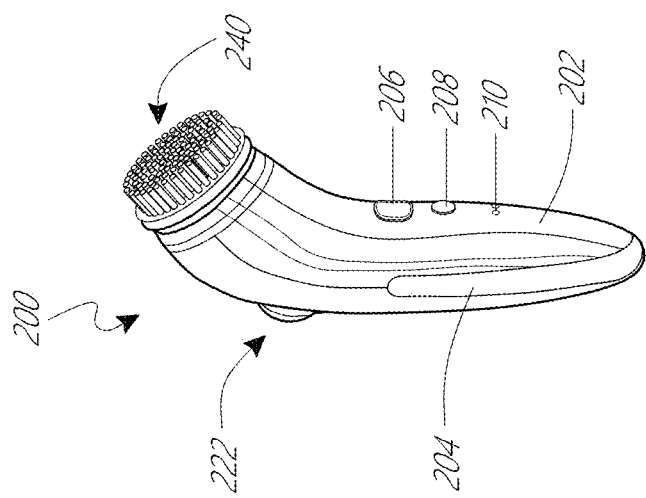
FIG. 2A shows a partial front view of an embodiment of a treatment device.

FIGS. 2A and 2B show an illustrative embodiment of a device 200 of the present disclosure. The device 200 can have a bent or dog-leg form. The device 200 can have a handle portion 202 that is sized to be gripped by the hand of a user. The handle portion 202 can include a gripping feature 204 that enhances the ability of a user to hold the handle portion 202. As shown in FIG. 2A, the gripping feature 204 can be a strip of material such as, for example, silicone that enhances a user's ability to grip the handle portion 202. In some arrangements, the gripping feature 204 enhances the ability of a user to grip the handle portion 202 when the handle portion is wet. The device 200 can include an indicator 206 that can indicate a status of the device, such as, for example the charge status of the device 200. The device 200 can include a controller 208 that allows a user to control the operation of the device 200. For example, the controller 208 can allow a user to modify the speed the device 200 rotates the attachment head 240. The device 200 can include a charging dock 210 that allows the device 200 to establish an electrical connection with a charging device.

As shown in FIGS. 2A and 2B, the treatment head 240 can be disposed on an end of the device 200. The treatment head 240 can be angled relative to the handle portion 202 by an angle of approximately 45°. The device 200 can include a fixed camera 222 that is disposed on the handle portion 202 in the vicinity of the bent region of the device 200. As shown in FIG. 2B, the fixed camera 222 can be disposed on a surface of the device 200 that faces away from treatment head 240.

Figure 3B:
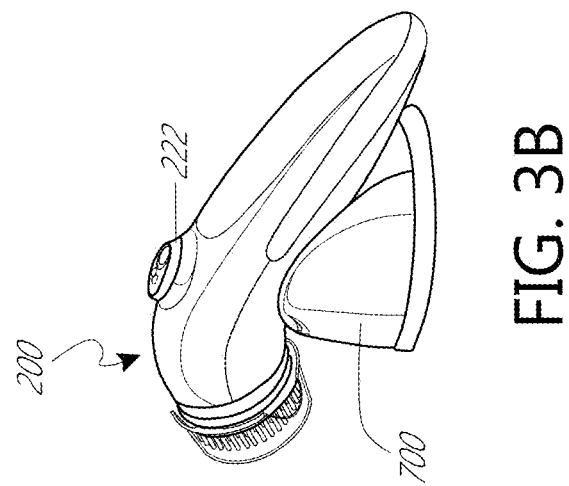
FIG. 3B shows a perspective view of the treatment device of FIG. 2A in the docking cradle of FIG. 3A.
Figure 3A:
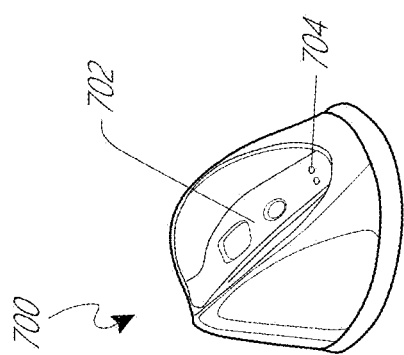
FIG. 3A shows a partial front view of an embodiment of a docking cradle.

FIG. 3A illustrates a docking cradle 700 for the device 200. The docking cradle 700 can include a recessed central portion 702 that can be sized to hold the device 200. The device 200 can rest in the docking cradle 700 in a substantially horizontal position, as shown in FIG. 3B. The docking cradle 700 can include a charging port 704 that aligns with the charging dock 210 (shown in FIG. 2A) of the device 200 when the device 200 is seated in the docking cradle 700. The charging port 704 and charging dock 210 can establish an electrical circuit when each is aligned with one another, thereby allowing the device 200 to be charged when the device 200 is seated in the docking cradle 700.

FIGS. 4A and 4B illustrate an embodiment of a docking cradle 700A and a device 200A. The docking cradle 700A can be similar to the docking cradle 700 except as differently described. The device 200A can be similar to the device 200 except as differently described. The docking cradle 700A can be sized to hold the device 200A in a substantially vertical orientation, as illustrated in FIGS. 4A and 4B. The device 200A can include an indicator 206A and a controller 208A similar to the indicator 206 and the controller 208 as described with regard to the embodiment of the device 200 shown in FIGS. 3A and 3B. The device 200A can have a treatment head 240A that is substantially perpendicular to the handle portion 202A of the device 200A, as shown in FIG. 4A. The device 200A can include a fixed camera 222A that can be axially aligned with the treatment head 240A, as depicted in FIG. 4B. The fixed camera 222A can be disposed on the handle portion 202A on a side that is opposite of the treatment head 240A.

Figure 5B:
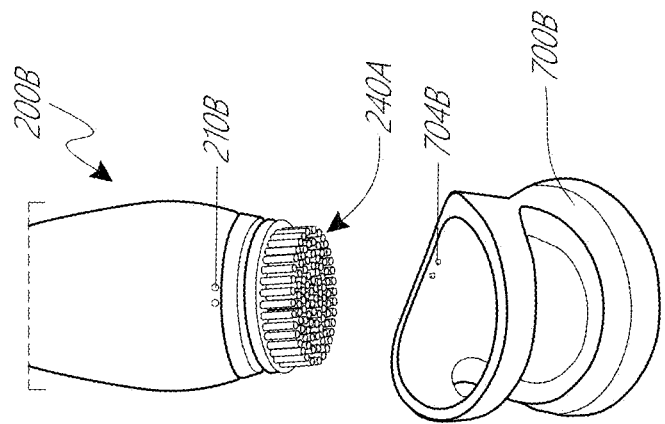
FIG. 5B shows the treatment device and docking cradle of FIG. 5A.
Figure 5A:
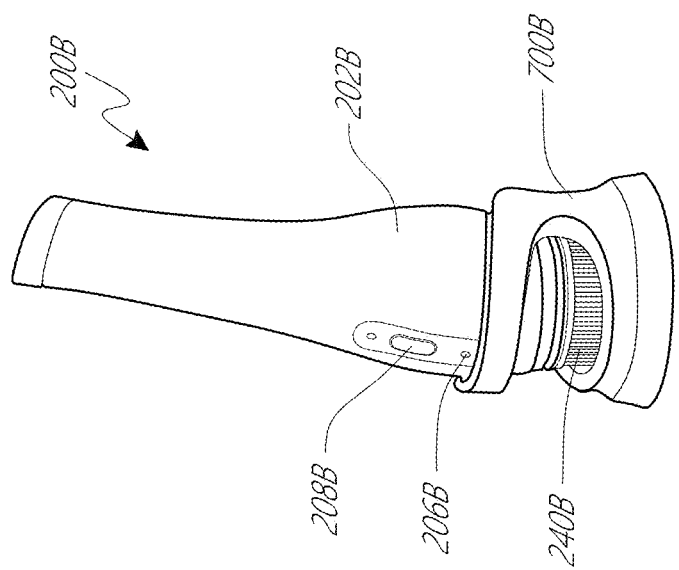
FIG. 5A shows a partial front view of an embodiment of a treatment device in a docking cradle.

FIGS. 5A and 5B illustrate an embodiment of a docking cradle 700B and a device 200B. The docking cradle 700B can be similar to the docking cradle 700A except as differently described. The device 200B can be similar to the device 200A except as differently described. The docking cradle 700B can be sized to hold the device 200B in a substantially vertical orientation, as illustrated in FIG. 5A. The device 200B can include an indicator 206B and a controller 208B similar to the indicator 206A and the controller 208A as described with regard to the embodiment of the device 200A shown in FIGS. 4A and 4B. The device 200B can have a treatment head 240B that is substantially axially aligned with the handle portion 202B of the device 200B, as shown in FIG. 5A. The device 200B can include a charging dock 210B that can align with a docking port 704B to allow the device 200B to charge when inserted into the docking cradle 700B, as described above.

Referring to FIG. 5C, the device 200B can allow different treatment heads 240 (e.g., a detachable camera 246B, a brush 242B) to be attached to the handle portion 202B of the device 200B. The detachable camera 246B can be similar to the detachable camera 246 described above, except as differently described below. The detachable camera 246B can be disposed on an end of the handle portion 202B. The detachable camera 246B can be axially aligned with a longitudinal axis of the handle portion 202B, as shown in FIG. 5C. The detachable camera 246B can seat within a platform 230 of the device 200B. The device 200B can include an interface 232 that establishes an electrical connection with the detachable camera 246B when the detachable camera 246 is seated in the platform 230. The interface 232 can be configured to transfer data from the detachable camera 246 and/or power to the detachable camera 246. The device 200B can include a drive shaft 234 that can drive a treatment head 240 (e.g., a brush 242B) when the accessory is seated on the drive shaft 234. For example, the drive shaft 234 can be adapted to rotate a brush 242B that is seated on the drive shaft 234.

Figure 5F:
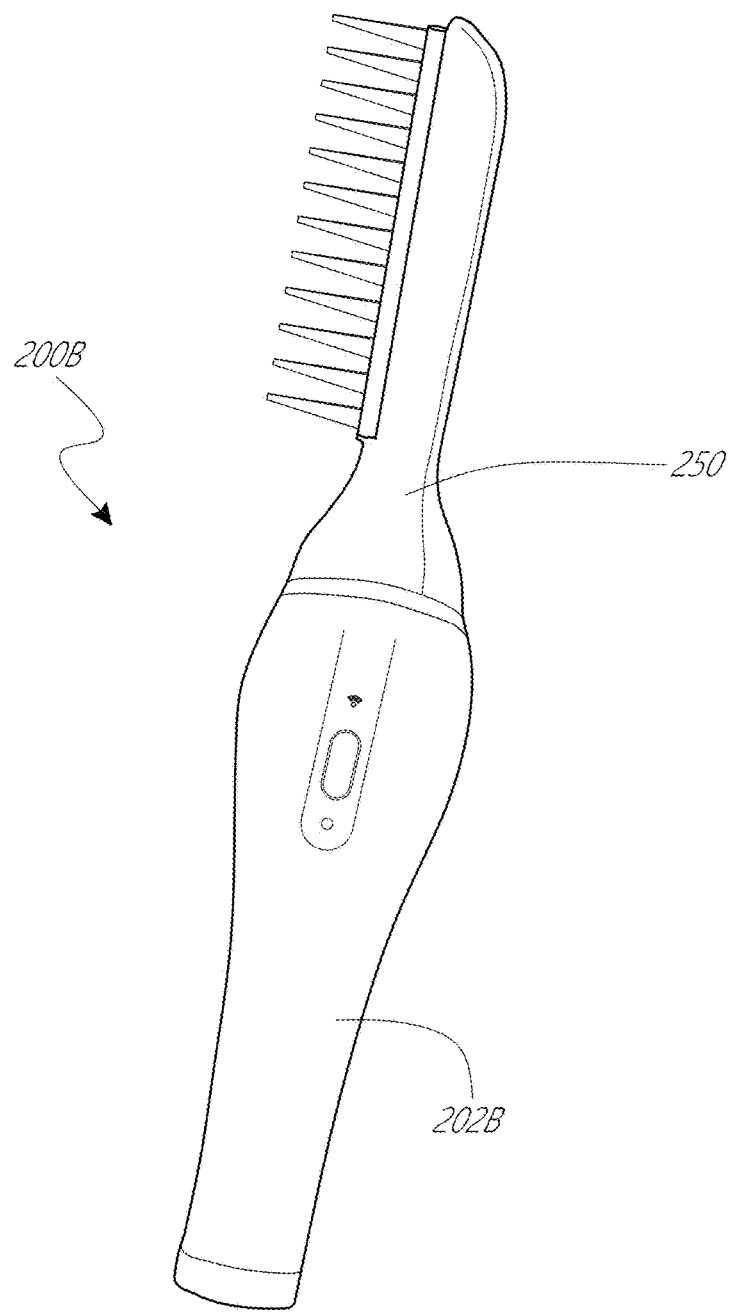
FIG. 5F shows the treatment device of FIG. 5C with a comb attached to the treatment device.

FIGS. 5D-5F show different treatment heads 240 (e.g., a detachable camera 246B, a treatment head 240B, a hair appliance 250) can be mounted onto the device 200B. FIG. 5D shows a device 200B with a detachable camera 246B mounted onto the device 200B. FIG. 5E shows a device 200B with a treatment head 240B mounted onto the device 200B. FIG. 5F shows a device 200B with a hair appliance 250 mounted onto the device 200B.

Figure 6:
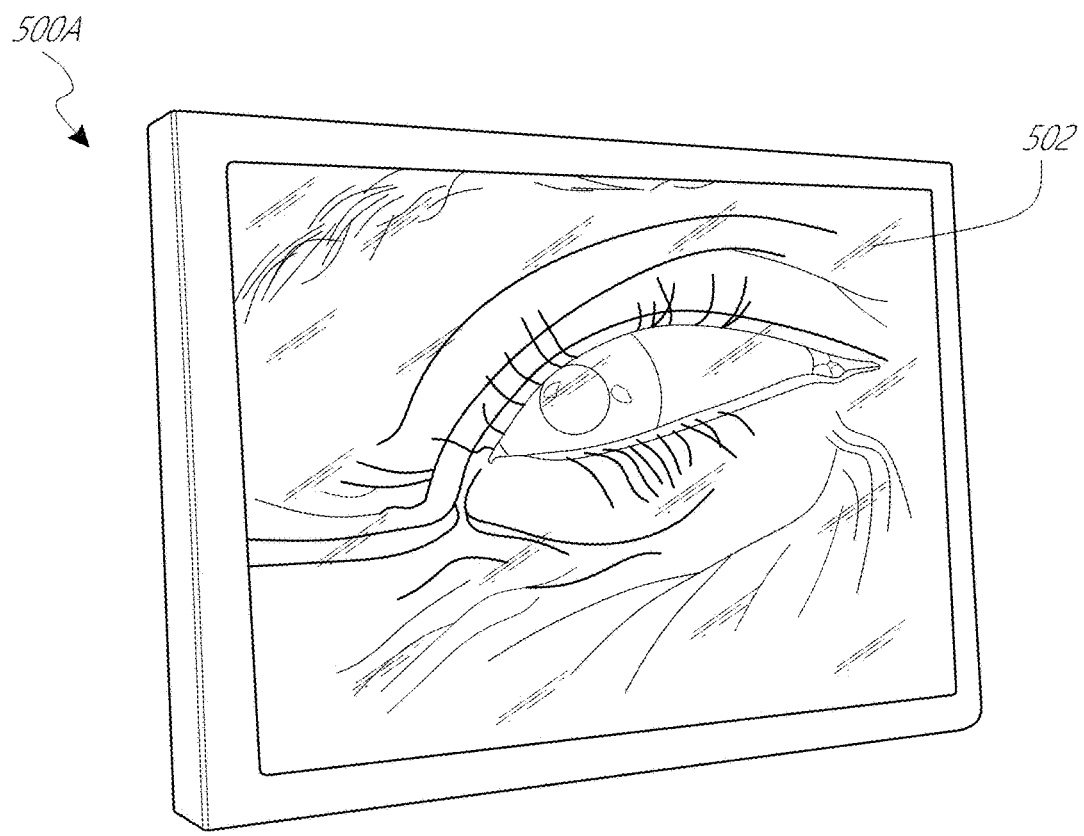
FIG. 6 shows an embodiment of a display which can be used in certain embodiments in combination with the treatment devices disclosed herein.

FIG. 6 shows an embodiment of a display 500A. The display 500A can be similar to the display 500 except as differently described. The display 500A can be a mini-monitor. The display 500A can come pre-loaded with the API 300, as discussed above. The display 500 can have a screen 502 that displays an image. The screen 502 can be a 5-inch screen. The screen 502 can allow a user to better see features of the skin, such as, for example pores or wrinkles. Accordingly, in certain embodiments the display 500A can be used and/or provided in combination with the devices 200, 200A, 200B described herein so as to provide a convenient standalone system in which the images captured from the devices 200, 200A, 200B can be displaced on the display 500A without the need for a separate display device.

Figure 7B:
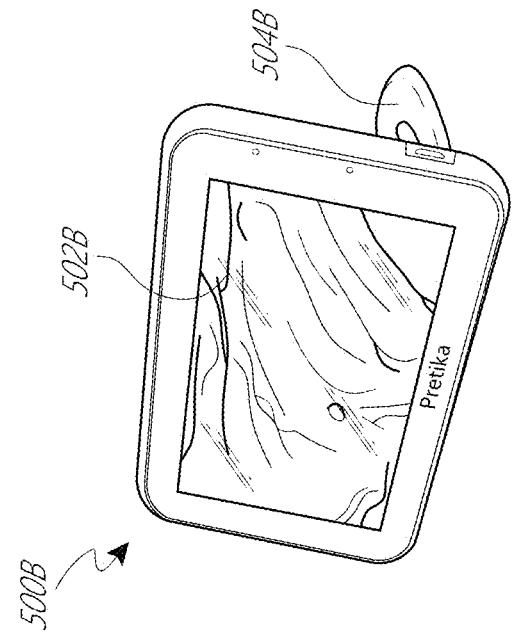
FIG. 7B shows the treatment device of FIG. 7A with the handle folded to support the display.
Figure 7A:
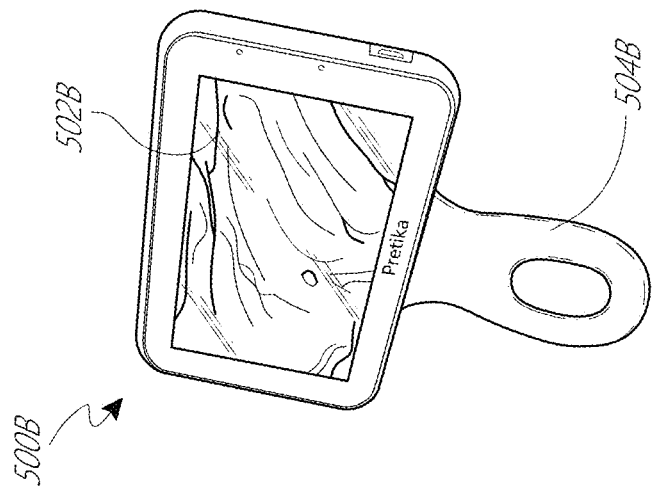
FIG. 7A shows an embodiment of a display having a handle.

FIGS. 7A and 7B show an embodiment of a display 500B having a foldable handle 504B. The display 500B can be similar to the display 500A except as differently described. The display 500B can be included with the device 200 so that a user need not have a mobile phone 400 or other home computing device (e.g., tablet, personal computer) in order to view images taken with the device 200 and/or to use the API 300 of the system 100. The foldable handle 504B can be moveable and can have an extended configuration (shown in FIG. 7A) and a folded configuration (shown in FIG. 7B). The foldable handle 504B can be arranged to pivot about the portion of the handle 504B that is attached at the back of the screen 502B. The foldable handle 504B can be rotated about the portion of the handle 504B that attaches at the back of the screen 502B, allowing the handle 504B to move between the extended and the folded configurations. In the extended configuration, the handle 504B can be substantially parallel with the screen 502B of the display 500B. When the handle 504B is in the extended configuration, a user can hold the display 500B as the user would hold a handheld mirror. In the folded configuration, the handle 504B can form an angle with the display 502B, allowing the handle 504B to serve as a base that supports the display 500B and holds the display 500B in a substantially upright orientation.

In the illustrated embodiment shown in FIG. 7B, the handle 504B forms an angle of about 60 degrees with the screen 502B, thereby holding the screen 502B about 30 degrees from vertical. In certain arrangements, the handle 504B forms an angle other than 60 degrees with the screen 502B. The handle 504B can be adapted to have a plurality of folded configurations. For example, the handle 504B can have a first folded configuration that holds the screen 502B about 10 degrees from vertical and a second folded configuration that holds the screen about 45 degrees from vertical. The handle 504B can have a folded configuration that holds the screen 502B from vertical by an angle of: 5 degrees, 10 degrees, 20 degrees, 30 degrees, 45 degrees, 60 degrees, 80 degrees, other values of degrees, and values therebetween.

In some arrangements, the foldable handle 504B can be reversibly attached to the display 500B. For example, the foldable handle 504B can be attached to a frame (not shown) that is sized to receive the display 500B, allowing a user to insert or remove the display 500B from the frame. In certain arrangements, the foldable handle 504B can be attached to a frame that is sized to receive a mobile phone 400, thereby allowing a user to attach the foldable handle 504B to the mobile phone 400 of the user.

Figure 8:
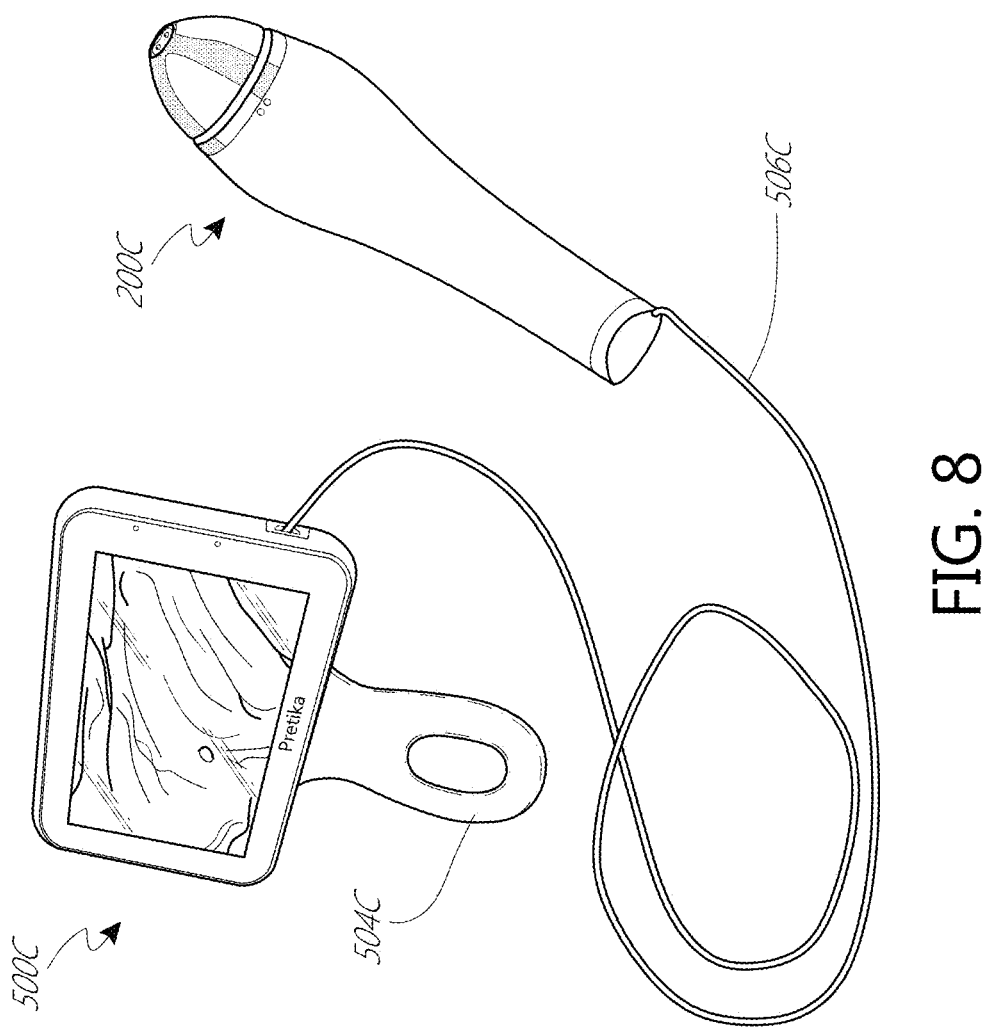
FIG. 8 shows the display of FIG. 7A in electrical communication with the treatment device through a wired connection.

FIG. 8 shows an embodiment of a display 500C having a foldable handle 504C. A cable 506C can be attached to the display 500C and to the device 200C. The cable 506C can be used to make a wired connection between the device 200C and the display 500C. The cable 506C can be used to transmit data between the device 200C and the display 500C. For example, the cable 506C can transmit to the display 500C image data that has been acquired by the device 200C, allowing an image captured by the device 200C to be displayed on the display 500C.

Figure 9:
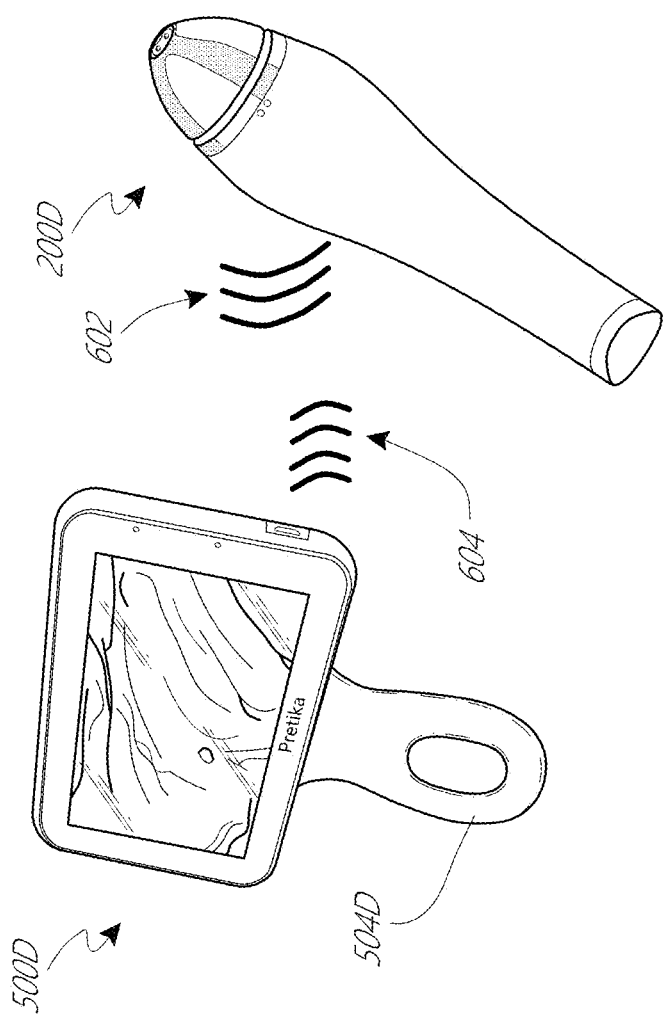
FIG. 9 shows the display of FIG. 7A in electrical communication with the treatment device through a wireless connection.

FIG. 9 shows a display 500D having a foldable handle 504D. The display 500D can be adapted to communicate with a device 200D through a wireless connection. The device 200D can transmit a device signal 602 that can be received by the display 500D. The display 500D can transmit a display signal 604 that can be received by the device 200D. The device signal 602 can include data (e.g., image data). The device signal 602 can include image data that can be displayed on the display 500D. For example, the device 200D can wirelessly transmit to the display 500D an image that was acquired by the device 200D, thereby allowing the display 500D to display the acquired image. The display signal 604 can include data (e.g., operational data). The display signal 604 can include data that modifies or controls operation of the device 200D. For example, the display signal 604 can include data that programs the device 200D to rotate a treatment head of the device 200D at a specific speed (e.g., rpm) for a specific amount of time.

Figure 10A:
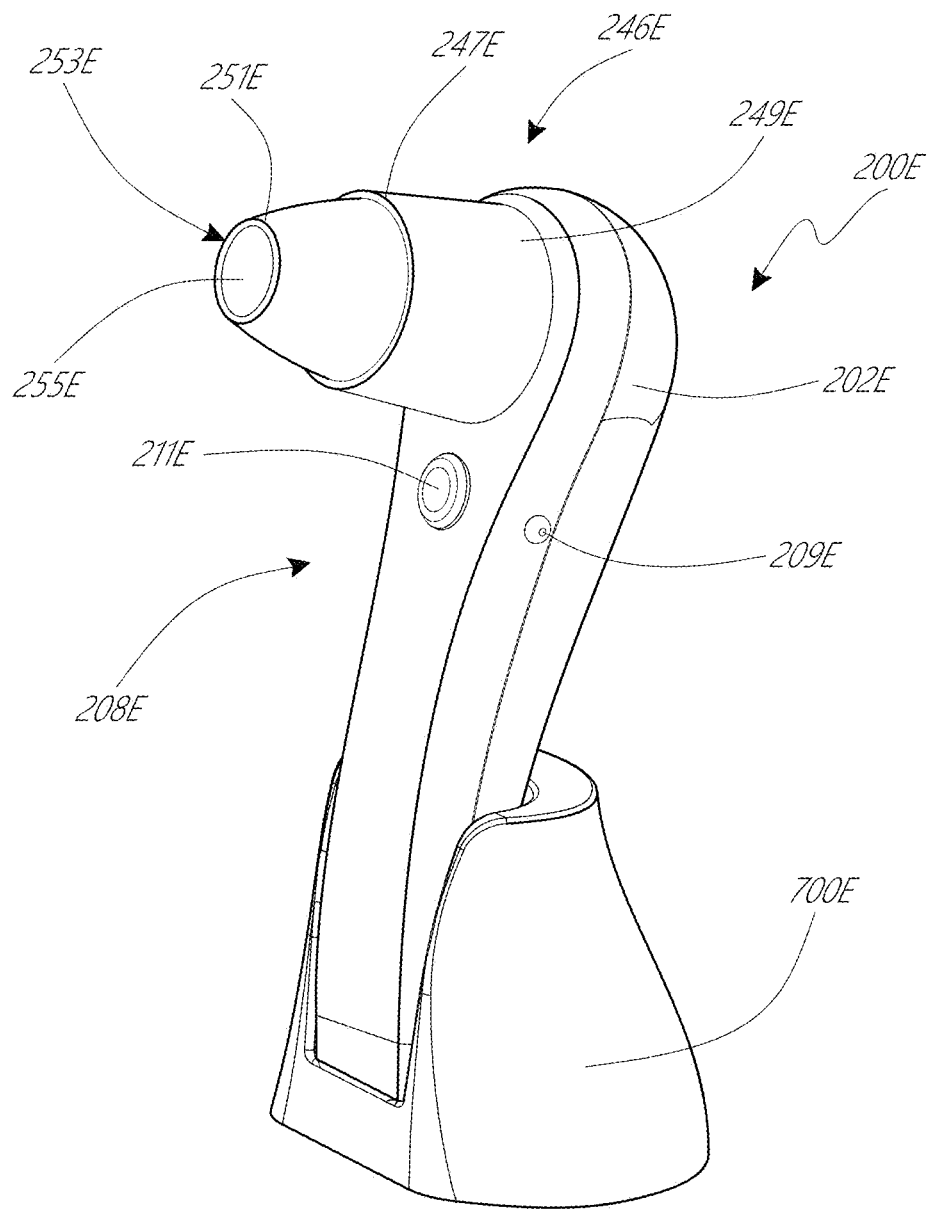
FIG. 10A shows a partial front view of an embodiment of a treatment device in a docking cradle.
Figure 10B:
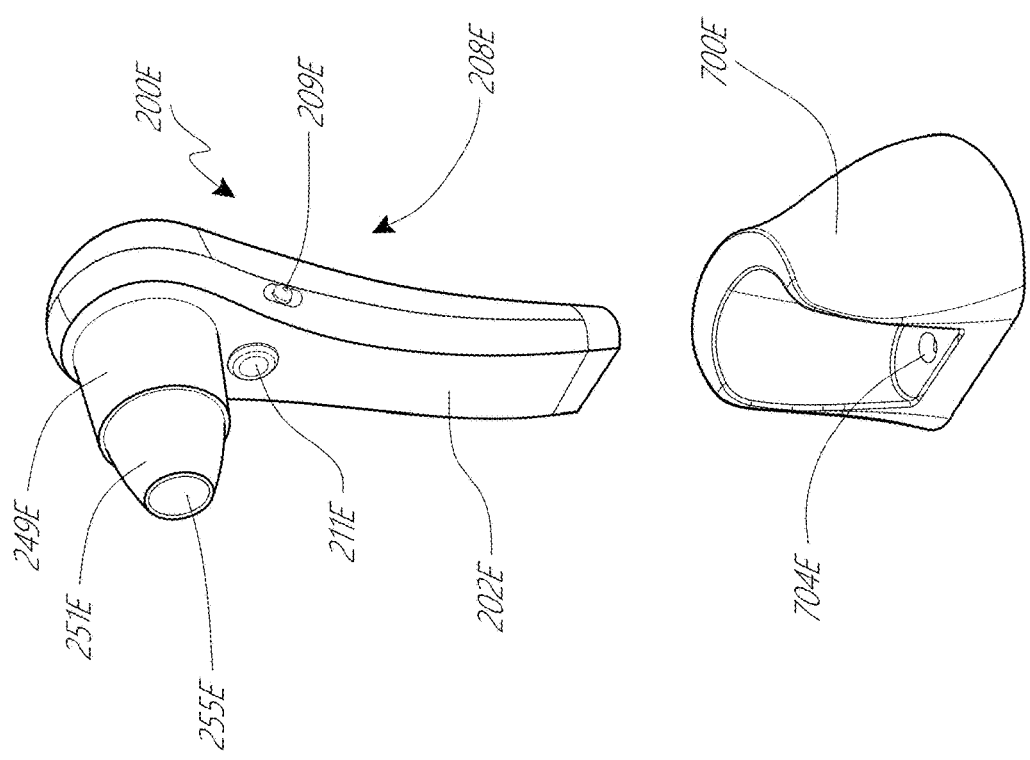
FIG. 10B shows the treatment device of FIG. 10A removed from the docking cradle.

FIGS. 10A and 10B illustrate an embodiment of a device 200E having a detachable camera 246E. The device 200E is shown seated in a docking cradle 700E in FIG. 10A. The device 200E is shown removed from the docking cradle 700E in FIG. 10B. The device 200E can be seated in the docking cradle 700E to charge the device 200E, as described previously. The device 200E can be similar to the device 200 except as differently described. The detachable camera 246E can be similar to the detachable camera 246 except as differently described. The docking cradle 700E can be similar to the docking cradle 700 except as differently described.

Referring to FIG. 10A, the detachable camera 246E can have a housing 247E. The housing 247E can have a base portion 249E. The base portion 249E can be adapted to attach to the handle portion 202E of the device 200. In the illustrated embodiment, the base portion 249E is substantially cylindrical. The housing 247E can have a tip portion 251E that is adjacent to the base portion 249E. In the illustrated embodiment, the tip portion 251E tapers away from the base portion 249E. The tip portion 251E can surround a central opening 253E of the housing 247E, as shown in FIG. 10A. In some arrangements, the central opening 253E is covered by a focusing lens 255E. In certain variants, the central opening 253E is not covered by a focusing lens 255E. As described in more detail below, the housing 247E can be shaped so that the detachable camera 246E is able to focus on a specific section of skin at a desired magnification. For example, the housing 247E can be arranged to provide the correct distance between the skin and a camera lens of the detachable camera 246E, allowing the detachable camera 246E to get the correct image of the skin.

The device 200E can have one or more controllers 208E that can be similar to the controller 208 except as differently described. In the illustrated embodiment, the device has a power controller 209E and a trigger controller 211E. The trigger controller 211E can activate the detachable camera 246E. For example, pressing the trigger controller 211E can activate the detachable camera 246E to take a picture. In certain arrangements, the trigger controller 211E can activate a treatment head 240 (shown in FIG. 1) that is attached to the device 200E. For example, pressing the trigger controller 211E can activate the treatment head 240 to rotate. The power controller 209E can override the trigger controller 211E. For example, the power controller 209E can be an ON/OFF switch. When the power controller is in the OFF position, the trigger controller 211E can be disabled such that pressing the trigger controller 211E does not activate a treatment head 240 or detachable camera 246E that is attached to the device 200E.

Figure 11:
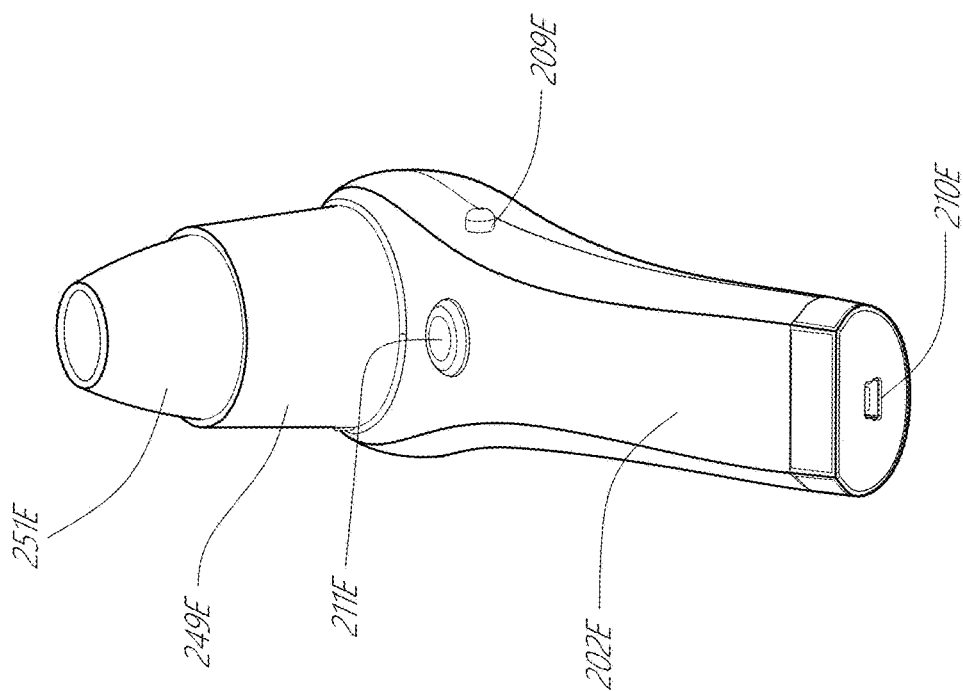
FIG. 11 shows a partial bottom view of the treatment device of FIG. 10A.

Referring to FIG. 10B and FIG. 11, the docking cradle 700E can have a charging port 704E that aligns with a charging dock 210E disposed on the device 200E when the device 200E is seated in the docking cradle 700E. As described previously with regard to FIGS. 2A-3B, the charging port 704E and the charging dock 210E can establish an electrical circuit when each is aligned with one another, thereby allowing the device 200E to be charged when the device 200E is seated in the docking cradle 700E.

Figure 12B:
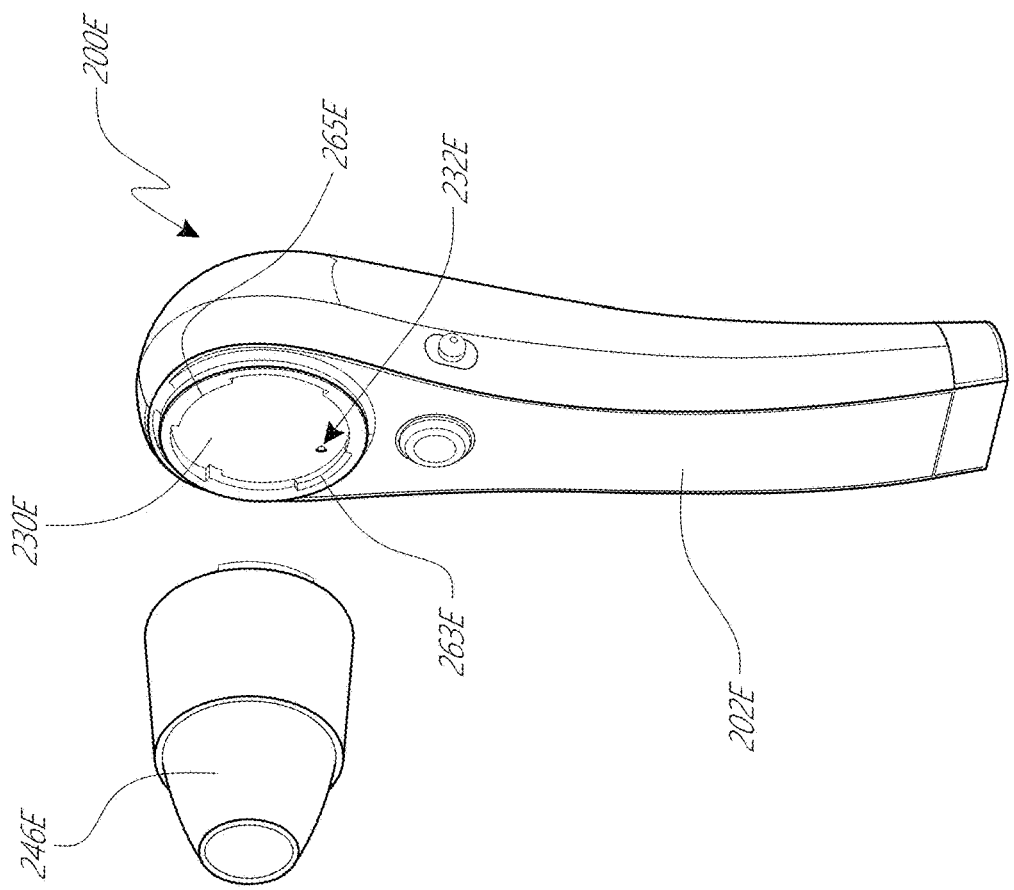
FIG. 12B shows the treatment device of FIG. 12B with the detachable camera removed from the handle portion.
Figure 12A:
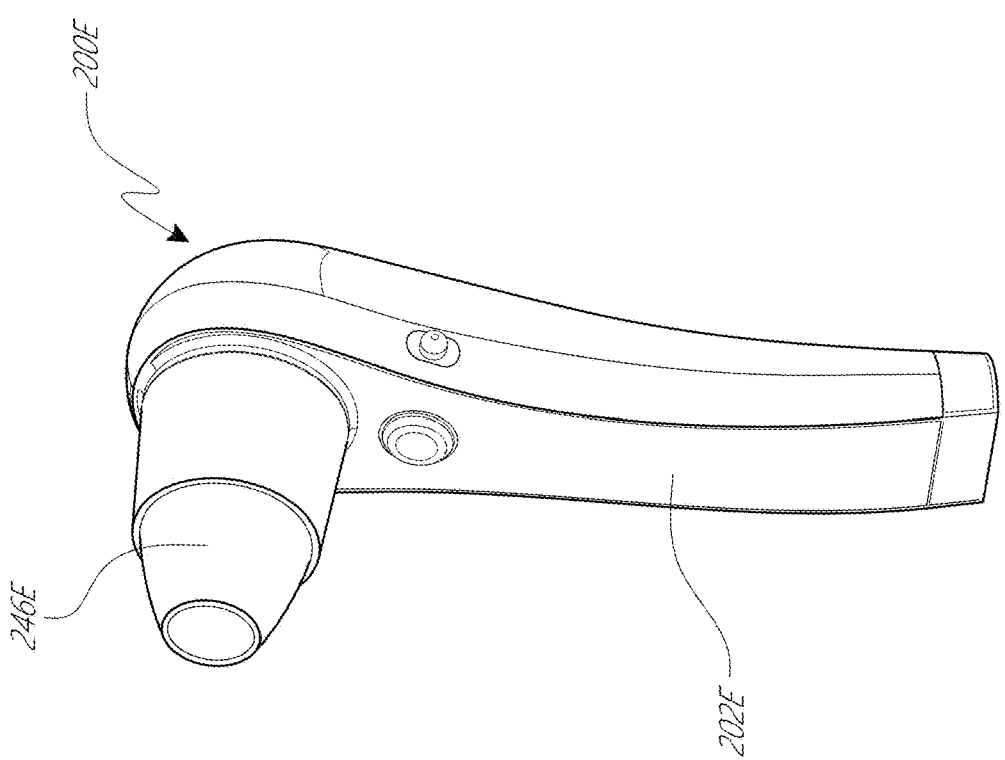
FIG. 12A shows a partial front view of the treatment device of FIG. 10A with the detachable camera attached to the handle portion.

FIGS. 12A and 12B illustrate that the detachable camera 246E can be reversibly attached to the platform 230E of the device 200E, as described with regard to FIGS. 5A-F. The detachable camera 246E is shown seated in the platform 230E in FIG. 12A. The detachable camera 246E is shown removed from the platform 230E in FIG. 12B.

FIGS. 13A-C illustrate different views of the detachable camera 246E. As shown in FIG. 13A, the detachable camera 246E can have a housing 247E that has a substantially cylindrical base portion 249E that is joined to a tapered tip portion 251E. FIG. 13B is a bottom view of the detachable camera 246E, illustrating that the base portion 249E can include features to allow the detachable camera 246E to attach to the platform 230E (shown in FIG. 12B) of the handle portion 202E. In the illustrated embodiment, the base portion 249E has a collar 257E that is shaped to seat into the platform 230E in a first orientation and then be locked to the platform 230E when the detachable camera 246E is rotated to a second orientation. For example, referring to FIGS. 12B and 13B, the detachable camera 246E can include one or more tabs 261E that can be inserted into a corresponding recess 263E of the platform 230E. The detachable camera 246E can then be rotated to bring the tab 261E underneath a flange 265E of the platform 230E, thereby locking the detachable camera 246E onto the handle portion 202E. The platform 230E can have an interface 232E that aligns with a corresponding interface 267E on the collar 257E when the detachable camera 246E is locked onto the handle portion 202E.

FIG. 13C is a cross-sectional view of the detachable camera 246E. In the illustrated embodiment, the detachable camera 246E is hollow with the base and tip portions 249E, 251E circumferentially surrounding a longitudinal axis of the detachable camera 246E. The detachable camera 246E can include a light source 269E that is circumferentially surrounded by the housing 247E. The light source 269E can illuminate the skin that covers the central opening 253E of the detachable camera 246E when the detachable camera 246E is in contact with the skin. The light source 269E can be configured to emit different light at different wavelengths and intensities. For example, the light source 269E can emit a first combination of light wavelengths and intensities that foster the imaging of wrinkles. The light source 269E can emit a second combination of light wavelengths and intensities that foster the imaging of pores. The second combination of light wavelengths and intensities can be different from the first combination of light wavelengths and intensities. The device 200E can allow a user to select the wavelengths and intensities of light that are emitted by the light source 269E. The light source can be an LED. The light source can be a light source other than an LED.

The detachable camera can include a camera lens 271E. In the illustrated embodiment, the camera lens 271E is disposed near the collar 257E. The base and tip portions 249E, 251E of the housing 247E can be sized so that camera lens 271E is the correct distance from the skin when the detachable camera 246E is in contact with the skin. In other words, the housing 247E can be sized so that the distance between the camera lens 271E and the end of tip portion 249E that surrounds the central opening 253 is the correct focal length to produce a sharp image of the skin at the desired magnification.

In some embodiments, the detachable camera 246E can include a focusing lens 255E. In the illustrated embodiment, the focusing lens 255E is disposed at the narrow end of the tapered tip portion 251E. The focusing lens 255E can be adapted to focus light on the camera lens 269E to produce a sharp image of the skin at the desired magnification.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A personal care system comprising:
   a handheld treatment device;
   a treatment head disposed on the treatment device and configured to apply a treatment to a skin of a user;
   a fixed camera disposed on the treatment device, the fixed camera disposed on a surface of the handheld treatment device that faces away from the treatment head; and
   an application programming interface (API) that allows the user to capture one or more images of the skin then use said one or more images to recommend or adjust the use of a skin care device.

2. The personal care system of claim 1 wherein the handheld treatment device can be selected from the group consisting of a facial brush, a micro current device, a LED light device and an ultrasound device.

3. The personal care system of claim 1 wherein the API can recommend a topical skin care product.

4. The personal care system of claim 1, wherein the camera can acquire the one or more images at a magnification of 10× to 400×.

5. The personal care system of claim 1 in combination with a display for displaying images captured by the camera.

6. The personal care system of claim 1, wherein the fixed camera is waterproof or water-resistant.

7. The personal care system of claim 1, wherein handheld treatment device has a bent form with a bent portion positioned between the treatment head and a handle portion.

8. The personal care system of claim 7, wherein the fixed camera is on the bent portion.

9. The personal care system of claim 1, wherein the treatment head includes a brush.

10. The personal care system of claim 9, wherein the treatment head rotates the brush.

11. The personal care system of claim 1, wherein the treatment head can be reversibly coupled to a platform.

12. The personal care system of claim 11, wherein treatment head can be selected from the group consisting of a facial brush, a micro current device, a LED light device and an ultrasound device.

13. The personal care system of claim 11, wherein treatment head is a facial brush.

14. The personal care system of claim 1 comprising a display for displaying images captured by the camera.

15. The personal care system of claim 14, wherein the display comprises a foldable handle.

16. A personal care system comprising:
a handheld treatment device;
a treatment head disposed on the treatment device and configured to apply a treatment to a skin of a user;
a camera disposed on the treatment device; and
an application programming interface (API) that allows the user to capture one or more images of the skin then use said one or more images to recommend or adjust the use of a skin care device, wherein the camera is a detachable camera that can be removed from the treatment device.

17. The personal care system of claim 16, wherein the detachable camera comprises a housing circumferentially surrounding a focusing lens.

18. The personal care system of claim 17, wherein the focusing lens is longitudinally spaced apart from a camera lens by a distance equal to a focal length of the focusing lens.

19. The personal care system of claim 18, wherein the detachable camera comprises the camera lens.

20. The personal care system of claim 16, wherein the detachable camera further comprises a housing and a light source that is circumferentially surrounded by the housing.

21. A personal care system comprising:
a handheld treatment device;
a treatment head disposed on the treatment device and configured to apply a treatment to a skin of a user;
a camera disposed on the treatment device; and
an application programming interface (API) that allows the user to capture one or more images of the skin then use said one or more images to recommend or adjust the use of a skin care device, wherein each of the camera and the treatment head can be reversibly coupled to a platform disposed on the handheld treatment device.

22. A personal care system comprising:
a handheld treatment device;
a treatment head disposed on the treatment device and configured to apply a treatment to a skin of a user;
a camera disposed on the treatment device;
an application programming interface (API) that allows the user to capture one or more images of the skin then use said one or more images to recommend or adjust the use of a skin care device; and
a display for displaying images captured by the camera, wherein the display comprises a foldable handle.

23. The personal care system of claim 22, wherein the foldable handle extends from a back surface of the display.

24. The personal care system of claim 23, wherein the foldable handle is movable between a first configuration and a second configuration, the foldable handle being substantially parallel with a screen of the display in the first configuration, the foldable handle forming an angle with the screen in the second configuration.

25. The personal care system of claim 24, wherein in the angle is between 20 degrees and 80 degrees.

26. A method of treating a skin comprising:
applying a treatment to the skin with a treatment head attached to a handheld treatment device;
acquiring an image of the skin with a fixed camera attached to the handheld treatment device on a surface of the handheld treatment device that faces away from the treatment head; and
processing the image with an application programming interface (API).

27. The method of claim 26, wherein acquiring an image of the skin comprises:
acquiring a first image before applying the treatment to the skin; and
acquiring a second image after applying the treatment to the skin.

28. The method of claim 26, wherein the treatment head is a facial brush.

29. The method of claim 28, wherein applying a treatment to the skin comprises rotating the facial brush.

30. A method of treating a skin comprising:
applying a treatment to the skin with a handheld treatment device;
acquiring an image of the skin with a camera attached to the handheld treatment device;
processing the image with an application programming interface (API);
attaching a treatment head to the handheld treatment device before applying the treatment to the skin;
removing the treatment head from the handheld treatment device after applying the treatment to the skin; and
attaching the camera to the handheld treatment device after removing the treatment head from the handheld treatment device.

* * * * *